Dec. 13, 1955  C. KRAUSS  2,726,907
BALL BEARING SWIVEL ASSEMBLY
Filed July 3, 1953
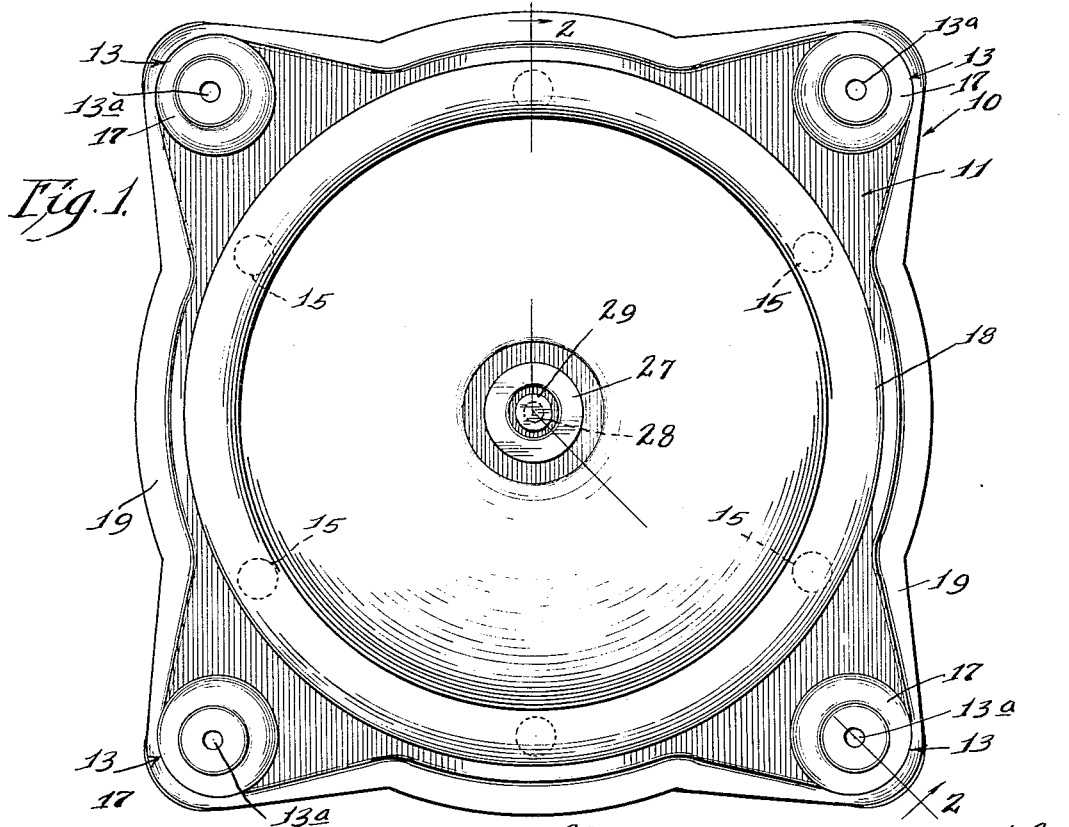
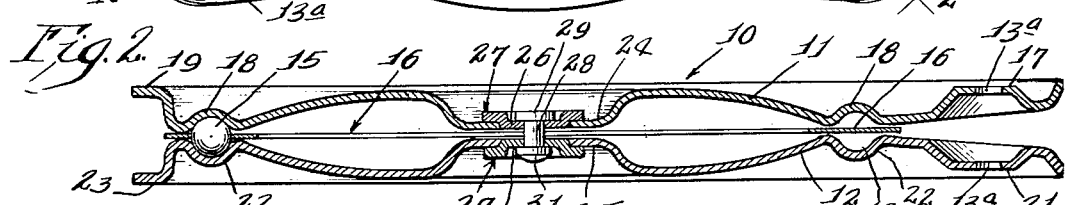
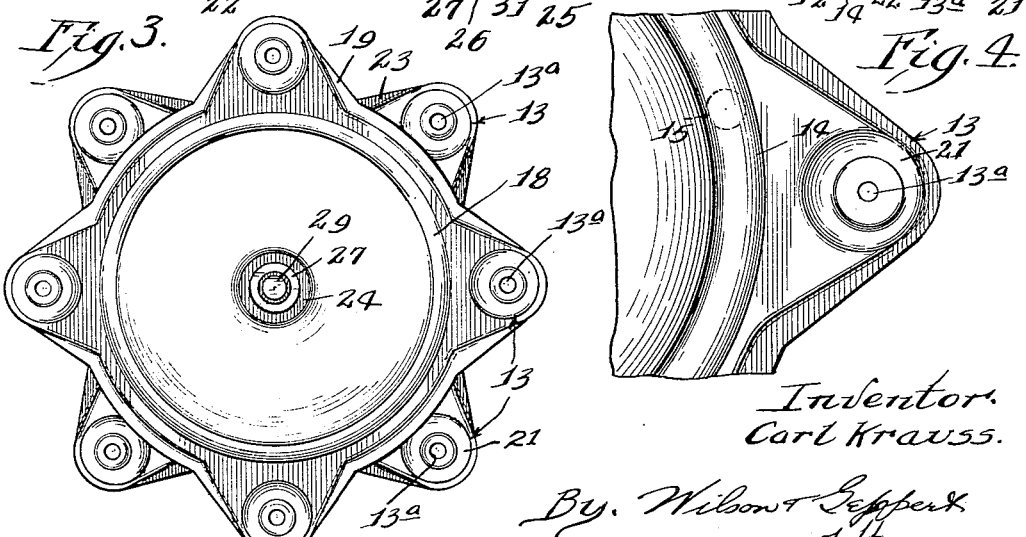
Inventor.
Carl Krauss.
By Wilson & Geppert
Attorneys.

United States Patent Office 2,726,907
Patented Dec. 13, 1955

2,726,907

BALL BEARING SWIVEL ASSEMBLY

Carl Krauss, Chicago, Ill.

Application July 3, 1953, Serial No. 365,881

3 Claims. (Cl. 308—227)

The present invention relates to a novel swivel assembly and more particularly to a novel ball bearing swivel for use in chairs, television tables or wherever a pivotal or rotatable mounting or turntable is desired or required.

Among the objects of the present invention is the provision of an improved swivel assembly or turntable so constructed and arranged as to assure smooth operation and long life even under the most severe or adverse conditions of use.

A further object of the present invention is the provision in a swivel assembly of a novel center thrust flange of case hardened steel providing a bearing surface effecting an important advantage over the present and prior types of commercial swivels in which the assembly is riveted at the center. Such rivets connecting the swivel parts do not provide an efficient good bearing surface, and particularly such as is required in a ball bearing swivel of the type and for the purpose here intended. Such rivets being of relatively soft metal and generally of substantially the same consistency as the metal of the adjoining swivel parts, will not adequately withstand the turning effort and wear to which the bearing surfaces of such swivels are subjected in use.

By providing the ball bearing swivel with a hardened steel center thrust flange or washer at one or both sides of the swivel assembly for receiving the head and/or upset end of the rivet and providing a bearing surface, wear is reduced to a minimum and maximum life and smooth operation of the swivel is assured. By this novel construction and arrangement heavy off-center loads may be carried smoothly and with a minimum of effort.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a top plan view of the novel swivel assembly adapted for use in relatively large turntables, parlor chairs or wherever a rigid assembly is desired for off-center loads.

Fig. 2 is a view in vertical cross section taken on the irregular line 2—2 of Fig. 1 and viewed in the direction of the arrows.

Fig. 3 is another top plan view of the novel swivel assembly of Fig. 1, but on a reduced scale and showing the upper plate turned or rotated through an arc or angle of approximately 45° from the position shown in Fig. 1.

Fig. 4 is a fragmentary top plan view of one corner of the lower plate showing its ribbed and flanged contour including the means for attaching one corner of this plate upon a supporting structure and the ball race for receiving the ball bearings.

Referring more particularly to the disclosure in the drawings and to the illustrative embodiment therein shown, the novel ball bearing swivel 10 of the present invention comprises an upper plate or member 11 adapted to be suitably affixed or secured to a table top, chair or other supported surface mounted for rotation, and a similar lower plate or member 12 mounted in reverse position and adapted to be affixed or secured to a relatively stationary supporting base, such as the base of a table, chair or the like, upon which the table top or chair rests and upon which it is mounted for rotation or pivotal movement. Each plate is shown provided with offsets 13 each having an opening 13a adapted to receive a bolt, screw or other attaching means for securing these plates to the supporting and supported surfaces to be swivelled or rotatably connected.

Each plate 11 and 12 is provided with an annular race or raceway 14 with these inwardly facing complementary races located in opposed but aligned position and adapted to receive therein suitably spaced ball bearings 15 for carrying the imposed load to which the swivel is subjected in use, and to permit relatively free rotation of the upper plate 11 and the table top, chair or other member it supports or carries. To maintain the ball bearings 15 in a desired spaced relation for most effectively carrying the load, a retainer or retaining means 16 in the form of an annular disc or rim but preferably formed of multiple arcuate segments connected at their ends to provide a continuous or annular retainer having uniformly spaced openings each adapted to receive and locate a ball bearing 15 with the bearings retained in a desired spaced relation within the opposed races 14.

These similarly constructed plates or members 11 and 12 are formed with embossments and are extensively ribbed and contoured whereby when these plates are assembled in opposed but operative relation in the manner shown in Fig. 2, the upper plate 11 is provided with embossments, ribs or raised surfaces at 17, 18 and 19, and the lower plate 12 with similarly arranged but depressed surfaces at 21, 22 and 23. The surfaces 17 and 21, 18 and 22, and 19 and 23, complement each other when these plates are disposed in coinciding and aligned position as in Figs. 1 and 3, with the surfaces 17 and 21 containing the openings 13a adapted to receive bolts, screws or other attaching means for attaching these plates 11 and 12 to their respective supports. The surfaces 18 and 22 provide opposed annular channels forming the continuous race 14 for the ball bearings 15, and the surfaces 19 and 23 provide a continuous flange or ribbed portion defining the peripheries of these plates. In addition, these plates 11 and 12 are dished and depressed or indented at 24 and 25, respectively, where they are pivotally connected. This extensive ribbed and embossed construction enables the employment of sheet steel or metal for the plates of substantially lighter gauge than that heretofore employed for a swivel assembly.

To mount the plates 11 and 12 in assembled relation with the ball bearings 15 disposed in suitable spaced relation by the retainer 16, the depressed or indented central portions 24 and 25 of these plates or members 11 and 12 are each provided with an opening and the aligned openings thereof are adapted to conformably receive an indented or cupped central portion 26 of a central thrust flange or washer 27. These thrust flanges or washers 27 are each provided with a centrally arranged opening of a size for conformably receiving the shank of a rivet 28 for connecting or joining the plates 11 and 12 and the upper and lower thrust flanges or washers 27 in assembled relation, but permitting rotation of the upper plate 11 relative to the lower plate 12, the rivet 28 and the thrust flanges 27. In the unit assembly, the head 29 and the upset end 31 of this rivet 28 are shown disposed within the indented or cupped central portion 26 of these thrust flanges or washers. Thus as the upper plate 11 and its supported or carried member, such as a television table, chair, etc., turns or rotates relative to the lower plate 12, these case hardened thrust flanges or washers 27 eliminate or substantially reduce wear between the parts. For example, wear between the rotatable upper plate 11 and its case hardened thrust flange 27 is reduced to a minimum and wear on the rivet by such rotation or turning effort is eliminated or avoided.

Although the drawing shows an upper and a lower thrust flange or washer 27 in the assembly, in some installations one of the flanges or washers may be eliminated. In that event, the central depressed portion 25 of the plate which receives no flange or washer is provided with a reduced opening to conformably receive the shank of the rivet 28 and the adjacent anchoring end of the rivet bears against the encompassing metal of the depressed portion 25.

The novel swivel assembly may be constructed in any desired number of sizes and is adapted for practically all purposes where a swivel mounting or turntable is desired.

Having thus disclosed the invention, I claim:

1. In a ball bearing swivel having two opposed plates mounted in superposed, spaced relation for relative rotation, each plate having a cupped central portion and an inwardly opening annular channel spaced from its central portion with the channels arranged in opposed but aligned relation, said opposed channels providing an annular race, spaced ball bearings in said races for smooth rotation and for maintaining radial alignment of said plates, a centrally arranged thrust washer having a relatively wide and offset circumferential flange of substantially harder metal than the plates and a recessed part conformably received in an opening in the center of the plate with the flange of the washer seating in the cupped central portion and about the opening in its plate, and a rivet projecting through the openings in said washers and plates and bridging the cupped central portion of these plates with the head of the rivet received in and tightly engaging the recessed part of one washer and the upset end of the rivet received in and tightly engaging the recessed part of the other washer whereby to join the thrust washers and maintain the swivel assembled with said thrust washers providing bearing surfaces for the plates and retaining said plates in predetermined, vertically spaced relation.

2. In a ball bearing swivel assembly, a pair of similarly contoured opposed plates mounted for relative rotation, an annular channel in each plate with the channel in each member arranged in opposed, aligned relation to provide a race and ball bearings disposed in spaced relation in said races maintaining radial alignment of said plates and rotation therebetween, each plate having a cupped central portion disposed in closely spaced relation and an aligned opening in said cupped portions, and means for connecting said plates in predetermined, vertically spaced relation and for relative rotation including a center thrust flange of hardened metal having a recessed part projecting into and conformably received in the opening in one of said plates and provided with an offset external flange overlapping and providing a relatively wide bearing surface against the cupped central portion of said plate about its opening, and a rivet projecting through an opening in the recessed part of the thrust flange and the aligned openings in said plates for joining the thrust flange to one of said plates and with the recessed part of the thrust flange receiving and supporting an end of the rivet.

3. A ball bearing swivel assembly comprising in combination a pair of plate-like members mounted in opposed relation and having means for attaching one member to a part to be supported for turning movement and means for attaching the other member to a supporting base, each member having a cupped central portion provided with a central opening and an annular channel spaced therefrom with the channels of opposed members arranged in opposed, aligned relation to provide races, ball bearings in said races for smooth rotation of said members and for maintaining said members in radial alignment, and means for connecting said members for relative rotation therebetween and for retaining said members in predetermined, vertically spaced relation, said last mentioned means including a center thrust washer having a depressed central part mounted and conformably received in the opening in the cupped central portion of one of said members and an annular and relatively wide and hardened flange seating upon the cupped central portion of said last mentioned member about its opening, and means for mounting the thrust washer in assembled relation and retaining said opposed members in predetermined, vertically spaced relation.

References Cited in the file of this patent
UNITED STATES PATENTS

| | | |
|---|---|---|
| 486,890 | Oliver | Nov. 29, 1892 |
| 2,234,344 | Hedges | Mar. 11, 1941 |
| 2,592,811 | Lebensfeld | Apr. 15, 1952 |